United States Patent
Jiang et al.

(10) Patent No.: US 11,042,587 B2
(45) Date of Patent: Jun. 22, 2021

(54) PERFORMING BEHAVIOR ANALYSIS ON AUDIO TRACK DATA TO OBTAIN A NAME OF AN APPLICATION

(71) Applicant: Honor Device Co., Ltd., Shenzhen (CN)

(72) Inventors: Zhongyin Jiang, Nanjing (CN); Kunfang Chen, Hangzhou (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 101 days.

(21) Appl. No.: 16/322,809

(22) PCT Filed: Sep. 5, 2016

(86) PCT No.: PCT/CN2016/098112
§ 371 (c)(1),
(2) Date: Feb. 1, 2019

(87) PCT Pub. No.: WO2018/040102
PCT Pub. Date: Mar. 8, 2018

(65) Prior Publication Data
US 2019/0205338 A1 Jul. 4, 2019

(51) Int. Cl.
*G06F 17/00* (2019.01)
*G06F 16/68* (2019.01)
(Continued)

(52) U.S. Cl.
CPC .............. *G06F 16/68* (2019.01); *G06F 3/165* (2013.01); *G06F 9/30003* (2013.01);
(Continued)

(58) Field of Classification Search
CPC ...... G06F 16/68; G06F 3/165; G06F 9/30003; G06F 17/00; G10L 15/00; G11B 27/28; H04N 21/439
See application file for complete search history.

(56) References Cited

U.S. PATENT DOCUMENTS 8,463,612 B1 6/2013 Neath et al.
8,528,019 B1 9/2013 Nevenka et al.
(Continued)

FOREIGN PATENT DOCUMENTS

CN 1408178 A 4/2003
CN 101231660 A 7/2008
(Continued)

OTHER PUBLICATIONS

Foreign Communication From a Counterpart Application, European Application No. 16914667.7, Extended European Search Report dated Jul. 15, 2019, 7 pages.
(Continued)

*Primary Examiner* — Joseph Saunders, Jr.
(74) *Attorney, Agent, or Firm* — Conley Rose, P.C.

(57) ABSTRACT

An audio processing method includes determining an audio data source, registering an audio block service for the audio data source to obtain registration information of the audio block service, where the registration information of the audio block service includes identification information used for performing the audio block service on the audio data source, performing software decoding on the audio data source to obtain audio track data when it is determined, based on the identification information, that the audio data source needs to be blocked, and performing behavior analysis based on the audio track data. Hence, audio track data can be collected in a targeted manner, the collected audio track data is converted into text through speech recognition, and the text can be used for semantic analysis or internally-recorded audio recognition.

20 Claims, 6 Drawing Sheets

(51) Int. Cl.
*G10L 15/00* (2013.01)
*G11B 27/28* (2006.01)
*G06F 3/16* (2006.01)
*G06F 9/30* (2018.01)
*H04N 21/439* (2011.01)

(52) U.S. Cl.
CPC .............. *G06F 17/00* (2013.01); *G10L 15/00* (2013.01); *G11B 27/28* (2013.01); *H04N 21/439* (2013.01)

(56) References Cited

U.S. PATENT DOCUMENTS

| | | |
|---|---|---|
| 2013/0145024 A1 | 6/2013 | Cao et al. |
| 2013/0159507 A1 | 6/2013 | Mason et al. |
| 2014/0006948 A1 | 1/2014 | Yang et al. |
| 2014/0181971 A1* | 6/2014 | Tatarinov ............... G06F 21/316 726/23 |
| 2015/0378670 A1 | 12/2015 | Reilly et al. |
| 2017/0310648 A1* | 10/2017 | Levchenko ......... H04L 63/0428 |

FOREIGN PATENT DOCUMENTS

| | | |
|---|---|---|
| CN | 101894114 A | 11/2010 |
| CN | 102176731 A | 9/2011 |
| CN | 102456344 A | 5/2012 |
| CN | 103221948 A | 7/2013 |
| CN | 105005578 A | 10/2015 |
| CN | 105144143 A | 12/2015 |
| CN | 105335498 A | 2/2016 |
| WO | 2012022021 A1 | 2/2012 |
| WO | 2016025277 A1 | 2/2016 |

OTHER PUBLICATIONS

Machine Translation and Abstract of Chinese Publication No. CN101231660, Jul. 30, 2008, 12 pages.
Machine Translation and Abstract of Chinese Publication No. CN101894114, Nov. 24, 2010, 16 pages.
Machine Translation and Abstract of Chinese Publication No. CN102456344, May 16, 2012, 19 pages.
Machine Translation and Abstract of Chinese Publication No. CN105005578, Oct. 28, 2015, 24 pages.
Foreign Communication From a Counterpart Application, PCT Application No. PCT/CN2016/098112, English Translation of International Search Report dated Jun. 7, 2017, 2 pages.
Foreign Communication From a Counterpart Application, PCT Application No. PCT/CN2016/098112, English Translation of Written Opinion dated Jun. 7, 2017, 5 pages.
Machine Translation and Abstract of Chinese Publication No. CN105335498, Feb. 17, 2016, 15 pages.
Foreign Communication From a Counterpart Application, Chinese Application No. 201680056198.2, Chinese Office Action dated Dec. 3, 2019, 6 pages.

* cited by examiner

PERFORMING BEHAVIOR ANALYSIS ON AUDIO TRACK DATA TO OBTAIN A NAME OF AN APPLICATION

CROSS-REFERENCE TO RELATED APPLICATIONS

This application is a U.S. National Stage of International Patent Application No. PCT/CN2016/098112 filed on Sep. 5, 2016, which is hereby incorporated by reference in its entirety.

TECHNICAL FIELD

The present invention relates to the audio processing field, and in particular, to an audio processing method and a device.

BACKGROUND

With rapid development of functions of electronic devices, the electronic devices have become indispensable tools for people. A user may use various multimedia applications on a terminal to play network media or local media. While abundant mobile Internet applications provide convenience to a user, a large amount of context (English: context) information is generated, such as an audio/video player, a call, an alarm, an agenda, navigation, a voice announcement, a WeChat voice message, and other audio information. The user may further transmit a Voice over Internet Protocol (English: Voice over Internet Protocol, VoIP) call, an instant messaging voice message, and the like over a network by using a mic (English: mic). The user may usually use the applications based on a habit or a preference of the user. Accordingly, behavior samples such as frequency, a time, and duration for using the applications by the user may reflect the habit or the preference of the user. However, because of function diversity of an electronic device, how to collect a user behavior sample becomes a technical problem that needs to be resolved urgently.

SUMMARY

The present invention provides an audio processing method. According to the present invention, audio track data can be collected in a targeted manner, and a user behavior sample can be obtained by analyzing the audio track data, so as to reduce difficulty in collection of the user behavior sample.

According to one aspect, the present invention provides an audio processing method. The method includes: determining an audio data source (for example, determining the audio data source by using an APP running on a terminal device, and a media player or a Voice over Internet Protocol built in an operating system); registering an audio block service for the audio data source, to obtain registration information of the audio block service, where the registration information of the audio block service includes identification information (for example, one or more of a stream type, a process identifier, a play mode, and the like) used for performing the audio block service on the audio data source; when it is determined, based on the identification information, that the audio data source needs to be blocked, performing software decoding on the audio data source to obtain audio track data (a PCM stream); and performing behavior analysis based on the audio track data. According to the present invention, audio track data can be collected in a targeted manner, the collected audio track data is converted into text through speech recognition, and the text can be used for behavior analysis such as semantic analysis or internally-recorded audio recognition. A user behavior can be analyzed based on the text obtained by converting the audio track data or based on recognized internally-recorded audio. This can implement collection of a user behavior sample, and reduce difficulty in user behavior analysis.

In an optional implementation, behavior analysis may be performed based on the audio track data and one or more of the following: an operating command and a name of an audio data package corresponding to the audio data source (for example, an APP package name). The operating command may be commands such as starting, pausing, ending, fast forwarding, and fast rewinding audio play, and the instructions may be collected based on an audio data source and a time. In the present invention, it can be more accurate to determine the user behavior sample by performing comprehensive analysis, so as to perform behavior analysis more accurately.

In another optional implementation, the determining, based on the identification information, that the audio data source needs to be blocked may include: determining an identification information set of the audio data source that needs to be blocked; determining whether the identification information in the registration information of the audio block service is in the identification information set; and when the identification information in the registration information of the audio block service is in the identification information set, determining that the audio data source needs to be blocked. According to the present invention, the identification information set that needs to be blocked needs to be pre-determined; when registration is performed for the audio data source, whether identification information of the current registration information is in the identification information set is determined; and when the identification information of the current registration information is in the identification information set, the audio data source corresponding to the current registration information needs to be blocked. According to the present invention, the audio data source that needs to be blocked can be blocked in a targeted manner. For an audio data source that does not need to be blocked, after the audio block service is registered, a normal play procedure of the audio data source that does not need to be blocked is not interfered with. It can be more accurate to determine the user behavior sample, and can save more resources.

According to a second aspect, an embodiment of the present invention provides a terminal device. The terminal device includes a processor and a memory. The memory is configured to store a program. The processor runs the program in the memory, so as to: determine an audio data source, and register an audio block service for the audio data source, to obtain registration information of the audio block service, where the registration information of the audio block service includes identification information used for performing the audio block service on the audio data source; when it is determined, based on the identification information, that the audio data source needs to be blocked, perform software decoding on the audio data source to obtain audio track data; and perform behavior analysis based on the audio track data.

In an optional implementation, the processor is further configured to: determine an identification information set of the audio data source that needs to be blocked; determine whether the identification information set in the registration information of the audio block service is in the identification information set; and when the identification information is in the registration information of the audio block service, determine that the audio data source needs to be blocked.

According to a third aspect, an embodiment of the present invention provides an audio processing device. The audio processing device includes an audio block service module, an audio track module, and a behavior analysis module. The audio block service module is configured to determine registration information of an audio block service, where the registration information of the audio block service includes identification information used for performing the audio block service on an audio data source. When determining, based on the identification information, that the audio data source needs to be blocked, the audio block service module sends first block indication information to the audio track module. The audio track module is configured to receive the first block indication information, and send, based on an indication of the first block indication information, audio track data corresponding to the audio data source to the audio block service module. The audio block service module is further configured to send, to the behavior analysis module, the audio track data sent by the audio track module. The behavior analysis module is configured to perform behavior analysis based on the audio track.

In an optional implementation, the audio block service module is further configured to send the registration information of the audio block service to the behavior analysis module; and the behavior analysis module is further configured to perform behavior analysis based on the audio track and the registration information of the audio block service.

In another optional implementation, the device further includes an operating system, where the operating system includes the audio block service module.

In still another optional implementation, the operating system further includes the audio track module.

In still another optional implementation, the device further includes a first application, configured to determine the audio data source, and register the audio block service with the audio block service module.

In still another optional implementation, the device further includes a second application, configured to send second block indication information to the audio block service module, where the second block indication information carries the identification information. After the audio block service is registered for the audio data source, the second block indication information is used to instruct the audio block service module to block the audio data source corresponding to the identification information that is included in the registration information of the audio block service and that is carried in the second indication information.

According to a fourth aspect, an embodiment of the present invention provides a computer storage medium, configured to store computer software instruction, and a computer runs the instruction to:

determine an audio data source, and register an audio block service for the audio data source, to obtain registration information of the audio block service, where the registration information of the audio block service includes identification information used for performing the audio block service on the audio data source;

when it is determined, based on the identification information, that the audio data source needs to be blocked, perform software decoding on the audio data source to obtain audio track data; and perform behavior analysis based on the audio track data.

It can be learned from the foregoing that, according to the present invention, audio track data can be collected in a targeted manner, and a user behavior sample can be obtained by analyzing the audio track data. This reduces difficulty in collection of the user behavior sample.

DESCRIPTION OF EMBODIMENTS

Figure 1:
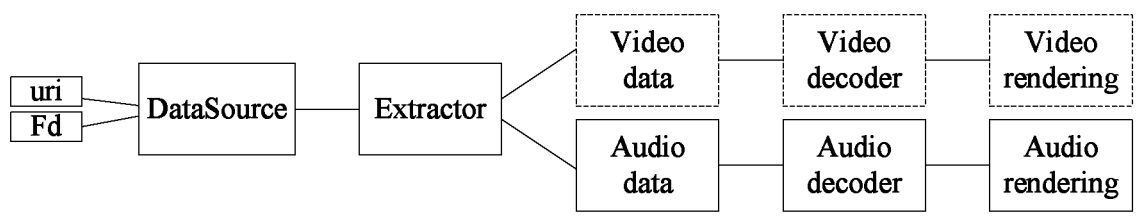
FIG. 1 is a schematic diagram of a play process of a data source.

It should be understood that, although the following provides an example implementation of one or more embodiments, a system and/or a method disclosed in the present invention may be implemented by using a plurality of other known or existing technologies. The present invention should not be limited to the descriptive implementation solutions, schemes, and technologies described in the following, including the example designs and implementation solutions described in this specification, and modification can be made within the scope of the accompanied claims and the complete scope of the equivalents thereof.

It should be noted that, a first application used in the present invention can be configured to determine an audio data source and register an audio block service with an audio block service module, that is, the first application is an application for playing the audio data source, such as a third-party application, or a media player or a Voice over Internet Protocol built in an operating system. A second application is configured to instruct the audio block service module to block specific audio data sources. The first application may be an APP running on a terminal device.

"First block indication information" is block indication information that is sent by the audio block service module to an audio track module, and the first block indication information is used to instruct the audio block service module to block audio track data corresponding to a specific audio data source. "Second block indication information" is block indication information that is sent by the second application to the audio block service module, and the second block indication information is used to instruct the audio block service module to block a specific audio data source. The second application may be an APP running on the terminal device.

"First" and "second" herein are merely for a purpose of distinguishing and do not constitute a limitation.

The following further details technical solutions of the present invention with reference to the accompanying drawings and the embodiments.

An operating system, such as an Android OS (Operating System, operating system), a Windows OS, or an iOS, usually runs on a terminal device. The operating system is mainly configured to manage and control computer hardware and software resources, and is most basic system software. The operating system may be understood as an interface between a user and a computer and an interface between computer hardware and other software. The other software can run only with support of the operating system.

In the embodiments of the present invention, the operating system may provide an audio block service, and the audio block service can be used to block audio track data obtained by decoding the audio data source. Another software program (the second application) may invoke the audio block service to block the audio track data, and perform user behavior analysis based on the blocked audio track data.

It should be noted that, the terminal device can differentiate the audio data source based on identification information used for performing the block service. For an audio data source that needs to be blocked, audio track data (a pulse code modulation (Pulse Code Modulation, PCM) stream) obtained by performing software decoding on the audio data source is blocked, and behavior analysis is performed based on the audio track data, the identification information used for performing the audio block service, and the like. For example, speech recognition, song recognition, or situation awareness is performed based on the audio track data, or comprehensive analysis is further performed based on recognized or aware information or other information.

Terminal devices related to the embodiments of the present invention may be a mobile phone, a tablet computer, a personal digital assistant (English: Personal Digital Assistant, PDA), a point of sales (Point of Sales, POS), an in-vehicle computer, or the like.

FIG. 1 is a schematic diagram of a play process of a data source. As shown in FIG. 1, an audio data source that needs to be played may be specified based on a uniform resource identifier (Uniform Resource Identifier, or URI) or a file descriptor (file descriptor, Fd) of the audio data source. For example, the URI or the Fd of the audio data source may be a uniform resource locator (URL, Uniform Resource Locator) of the HyperText Transfer Protocol (HyperText Transfer Protocol, HTTP) or the Real-Time Streaming Protocol (Real-Time Streaming Protocol, RTSP), an address (URI) of a local file, or a local file descriptor Fd.

In this embodiment of the present invention, the audio data source may include audio data (such as an audio file, a video file, and a VoIP data stream), and may further include an operating command (such as starting, pausing, ending, fast forwarding, and fast rewinding) for playing the audio data, and the like. The audio data is corresponding to the URI or the fd, and an action is corresponding to a command.

For example, an Android OS-based terminal device determines, by using setDataSourc, the audio data source (DataSource) corresponding to the URI or the fd, to provide data support for subsequent parsing (demux). It should be noted that, the data source is usually obtained by coding based on a specified coding format, and the data source can be decoded only after coder information is obtained by parsing the data source by using a parsing module (extractor). In addition, the data source may be obtained by compressing (encapsulating) both audio data and video data. However, audio needs to be played by using a loudspeaker, and a video needs to be displayed by using a display screen. Therefore, during play, separate audio data and separate video data, and decoder information respectively corresponding to the audio data and video data needs to be obtained by parsing. The data source may alternatively be compressed-only audio data, and in this case, decoder information of the data source also needs to be obtained by parsing.

Because encapsulated data sources are in various formats, different parsing modules (extractors) need to be generated by using the data sources generated by using setDataSourc. For example, a data source in an encapsulation format WMV (Windows Media Video, which is a unified name of a series of video codec and their related video coding formats that are developed by Microsoft) needs to be demultiplexed by using a WVMExtractor; a data source in an encapsulation format AMR (Adaptive Multi-Rate, Adaptive Multi-Rate compression) needs to be parsed by using an AMRExtractor; and the like.

After the data source obtained by compressing both audio and a video is parsed by using an extractor, separate video data and decoder information corresponding to the video data, and separate audio data and decoder information corresponding to the audio data are obtained. The extractor extracts audio and video streams in the encapsulation format, and sends the audio and video streams to an audio decoder and a video decoder, respectively. After parsing is performed by an extractor on the data source corresponding to the compressed-only audio data, decoder information corresponding to the audio data source is obtained.

Then, the terminal device needs to generate a decoder based on decoder information obtained by parsing. Different types of data sources are corresponding to different decoders.

In addition, a processing process of the audio data source may include hardware decoding and software decoding (software decoding requires a software decoder, and hardware decoding requires a hardware decoder).

After decoding is completed, audio track data or video track data is obtained, and audio or a video may be output after rendering is performed. For example, there may be a plurality of audio data sources that need to be played by the terminal device. Therefore, multiple pieces of audio track data are obtained after decoding is performed, and after mixing is performed by a mixer on the audio track data, mixed audio is played by driving the loudspeaker.

In this embodiment of the present invention, audio track data that is obtained after decoding and before mixing is blocked for behavior analysis.

The following further describes the present invention with reference to a structure of a terminal device provided in an embodiment of the present invention.

Figure 2:
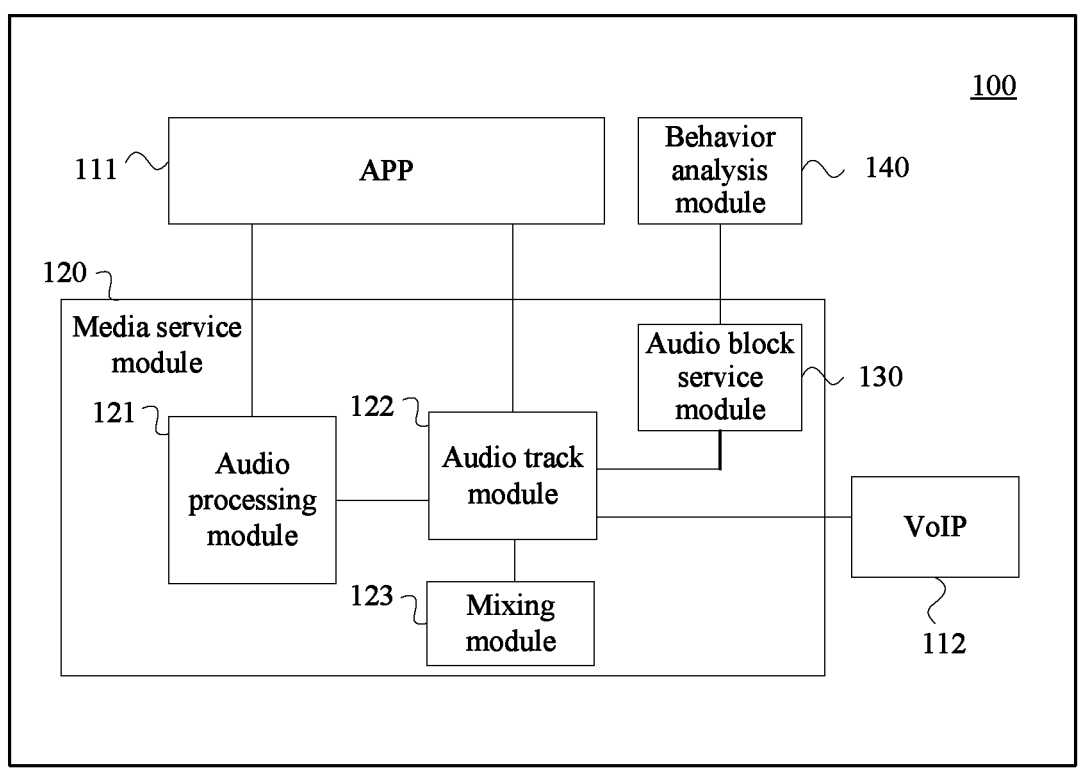
FIG. 2 is a schematic structural diagram of an audio processing device according to an embodiment of the present invention.

FIG. 2 is a schematic structural diagram of the terminal device according to this embodiment of the present invention. As shown in FIG. 2, the terminal device 100 in this embodiment of the present invention includes: an application (Application, APP) 111 (a first application), a media service module 120, an audio block service module 130, and a behavior analysis module 140 (which may be a second application, a service of an operating system, or another application). In this embodiment of the present invention, the media service module 120 and the audio block service module 130 may provide a service to the operating system running on the terminal device 100. The APP 111 running on the terminal device 100 may call an API (Application Programming Interface, application programming interface) provided by the operating system, to invoke a service corresponding to the API. In addition, the terminal device 100 may further include a Voice over Internet Protocol (Voice over Internet Protocol, VoIP) module 112 (for example, the VoIP module 112 may be the first application).

The VoIP module 112 may be provided by the operating system running on the terminal device 100.

The media service module 120 may be configured to decode audio data sources in a plurality of formats to obtain audio track data, perform mixing on the audio track data, and transmit mixed data to a hardware abstraction layer. The media service module 120 may include an audio processing module 121, an audio track module 122, and a mixing module 123. Audio data sources have a plurality of formats. The terminal device 100 may process audio data sources in different formats by using one or more audio processing modules 121 provided by the operating system, to obtain audio track data (that is, the processing is performed to implement a process, shown in FIG. 1, of decoding the audio data source by a decoder to obtain the audio track data), and provide the audio track data to the audio track module 122. The audio track module 122 provides the audio track data to the mixing module 123. After the mixing module 123 performs mixing on the audio track data, mixed data is played by driving hardware. The audio track module 122 outputs separate audio track data, and the mixing module 123 outputs audio track data obtained by performing mixing on all separate audio track data.

For example, the terminal device 100 may provide an audio processing module configured to play a call signal tone, an audio or video file, streaming media, game audio, a keypad tone, a video-synchronous audio, game-animation interaction audio, microphone-recorded audio, and another type of audio data source. Different types of audio data sources may be corresponding to different coding formats. For another example, an Android OS provides the following: a ToneGenerator (tone generator) configured to play a call signal tone; a MediaPlayer (media player) configured to play an audio file, a video file, and streaming media; a SoundPool (sound pool), which can perform low-latency play and can be configured to play game audio or a keypad tone; an AudioPlayer (audio player), which can be configured to play video-synchronous audio; a JetPlayer (an audio player), configured to play JETEngine audio, which may be game-animation interactive audio; and an AudioRecord, configured to control MIC recording.

The APP 111 may play, by invoking these modules and by using the operating system, an audio data source that needs to be played. The VoIP module 112 usually provides a service to the operating system, and may by directly using the operating system, the audio data source received on a network side. The operating system may also directly play the audio data source that needs to be played, for example, play audio by using the MediaPlayer (a system-default player).

When the terminal device plays the audio data source by using the audio processing module 121, the terminal device needs to create the audio track module (for example, an AudioTrack in the Android OS) 122 to play the audio data source. Specifically, the audio processing module 121 creates an audio decoder and the audio track module 122, and the audio decoder decodes the audio data source to obtain a pulse code modulation (Pulse Code Modulation, PCM) stream. The PCM stream is the audio track data. The mixing module 123 performs mixing or other processing on the audio track data, a digital-to-analog converter performs conversion on mixed data, and a loudspeaker plays converted-to data.

The application 111 or the VoIP module 112 may alternatively directly decode the audio data source to obtain the audio track data. In this case, the terminal device also needs to create the audio track module 122, and uses the audio track module 122 for play. For example, when the VoIP module 112 makes a Voice over Internet Protocol call, the terminal device receives an audio data source from a network (for example, a mobile communications network), the VoIP module 112 creates a decoder to decode the audio data source to obtain audio track data.

The terminal device may further provide a package manager (PackageManager) by using the operating system. The package manager may be configured to determine a name of an APP package corresponding to the audio data source. An application for the audio data source may be determined based on the package name. For example, an APP package name is com.baidu.music, it may be determined that the application is a Baidu music player.

In this embodiment of the present invention, the audio processing device 100 may provide the audio block service module 130 used in an audio block service. The audio block service module 130 may be disposed in the operating system. Registering with the audio block service module 130 needs to be performed for all audio data sources that need to be played, and the operating system may provide an API of the audio block service module 130. An APP with a behavior analysis module may invoke the audio block service module 130 by using the API of the audio block service module 130, to block an audio data source that needs to be blocked. For example, the audio block service module 130 may maintain an identification information table of the audio data source that needs to be blocked. When registering with the audio block service module 130 needs to be performed for an audio data source, the audio block service module 130 determines whether identification information of the audio data source is in the identification information table of the audio data source that needs to be blocked. If the identification information of the audio data source is in the identification information table of the audio data source that needs to be blocked, the audio block service module 130 blocks the audio data source. If the identification information of the audio data source is not in the identification information table of the audio data source that needs to be blocked, the audio block service module 130 does not block the audio data source. The identification information table may be determined based on identification information that is carried in received second block indication information sent by the second application. When second block indication information sent by a plurality of second applications is received, the identification information table may include a correspondence between identification information carried in the second block indication information and the second application. When the audio block service is performed, the blocked audio data source is sent to a corresponding second application based on the identification information table, so that the second application performs behavior analysis.

For example, when the audio processing device creates the audio track module 122, the audio block service is registered. Registration information may include an audio track module identity corresponding to the audio data source, a stream type (StreamType) in the audio track module, a process identifier (PID), an audio processing module ID (ModuleID), or the like.

It should be noted that, the audio processing device may include a plurality of first applications. When the first applications are configured to determine an audio data source, an audio track module corresponding to each first application may be created.

The audio processing module identity can be used to identify the audio processing module. For example, the MediaPlayer, the ToneGenerator, the SoundPool, the Audio- Player, and the JetPlayer in the Android system are identified by using different ModuleID identities.

The audio block service module 130 may block, based on the registration information, the audio track data (the PCM stream) corresponding to the audio data source that needs to be blocked. Another behavior analysis module 140 such as a situation awareness module performs behavior analysis (for example, performs speech recognition, song recognition, situation awareness, or the like based on the PCM stream; or further performs comprehensive analysis based on recognized or aware information or other information) based on the audio track data and the registration information. The another behavior analysis module 140 such as the situation awareness module may further perform comprehensive analysis in combination with other data. For example, the another behavior analysis module 140 performs comprehensive analysis based on an APP package name, or analyzes a status (for example, running) of a user based on data provided by a motion sensor, or performs comprehensive analysis based on a behavior analysis result provided by another application (for example, user's fitness data provided by a fitness APP). Further, for another example, a song recognition module learns, through analysis based on the audio track data, that piano music is being played; determines, based on the registration information of the block service, that an APP is a music player; and determines, based on the behavior result provided by the fitness APP, that the user is jogging. Another application or function module may perform analysis based on the information to obtain a comprehensive result, and analyze information such as a user behavior habit based on these results.

Figure 3:
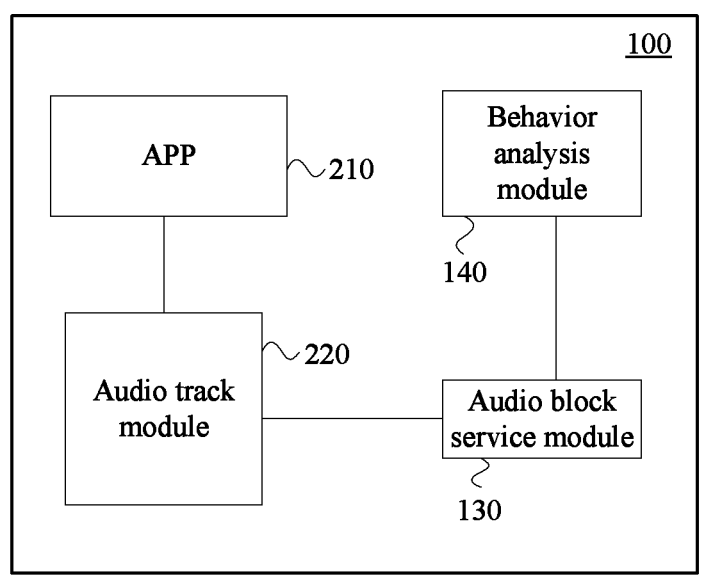
FIG. 3 is a schematic structural diagram of another audio processing device according to an embodiment of the present invention.

In another embodiment, as shown in FIG. 3, after determining a requirement for playing an audio data source, an APP 210 may create an audio track module 220. The APP 210 may directly decode the audio data source to obtain a PCM stream, and play the PCM stream by using the audio track module 220. In this embodiment of the present invention, the audio data source may not be played by an audio server provided by an operating system running on an audio processing device 100. Specifically, the APP 210 may directly create the audio track module 220 after determining the requirement for playing the audio data source, and register with an audio block service module 130. When audio is played, the audio block service module 130 blocks audio track data that needs to be blocked.

Figure 4:
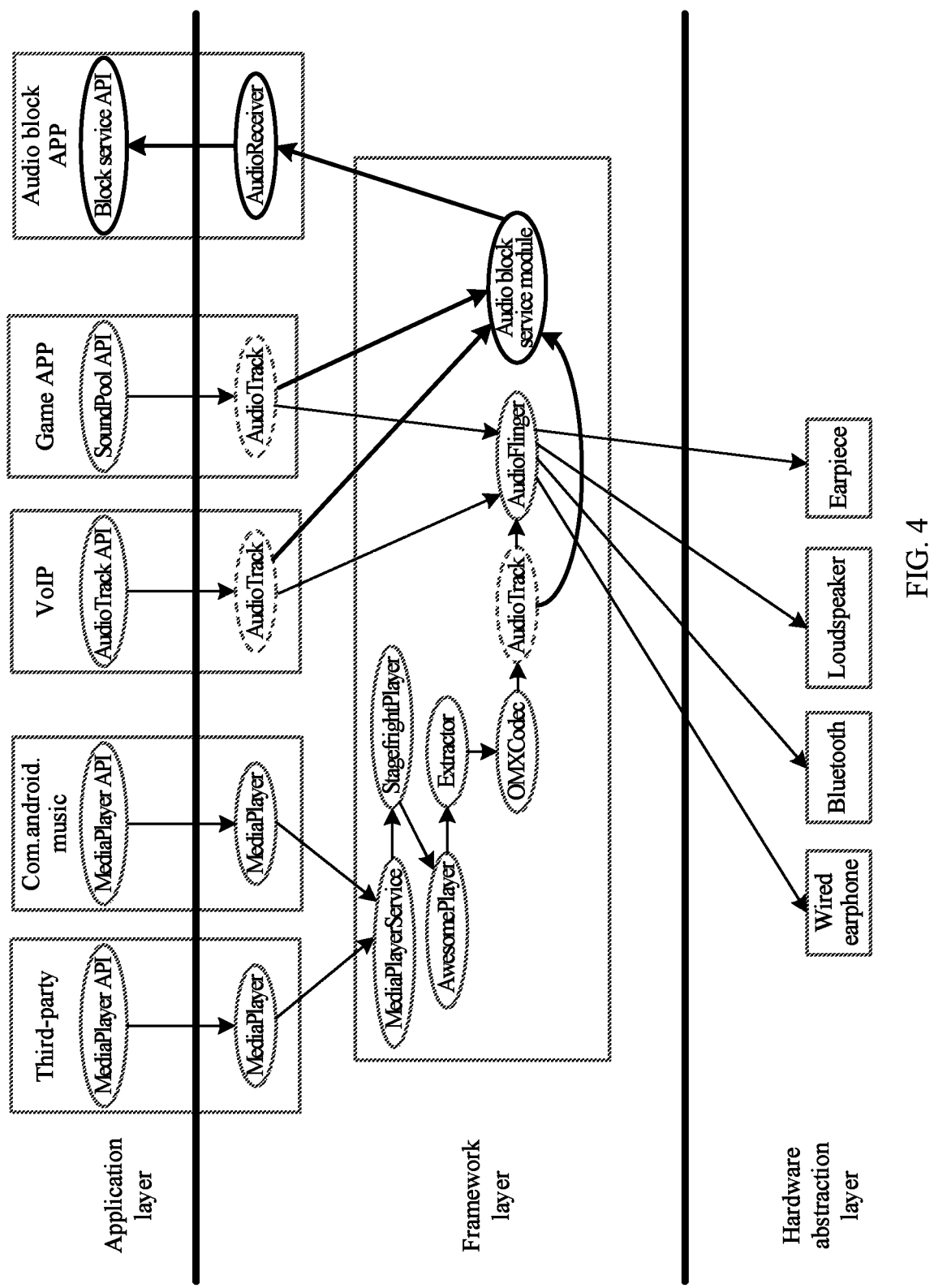
FIG. 4 is a schematic diagram of a play process of an audio data source according to an embodiment of the present invention.

With reference to FIG. 4, modules provided by an Android OS-based audio processing device are used as examples to further describe an embodiment of this aspect in the following. An operating system of the audio processing device includes an application layer, a framework layer, and a hardware abstraction layer. The application layer includes APIs provided by the operating system. The framework layer includes an audio processing module, an audio track module, a mixing module (AudioFlinger), and an audio block service module. The hardware abstraction layer includes a wired earphone, Bluetooth, a loudspeaker, an interface of hardware such as an earpiece.

The Android OS provides a MediaPlayer API, an AudioTrack API, a SoundPool API, and a block service API. Certainly, the Android OS may further provide more module APIs, and the foregoing APIs are merely used as examples for description in this embodiment of the present invention. A MediaPlayer, a SoundPool, and a block service module are provided by the Android OS by using a media service module (MediaServer).

In an example, a game APP calls the SoundPool API to play game audio. Specifically, during running of the game APP, a requirement for playing audio is generated, for example, playing background music, audio, or the like. These background music or audio files (audio data sources) are usually stored in an APP package (the APP package usually includes a program run by the APP, data, and the like) corresponding to the game APP. The game APP usually calls the SoundPool API in a process of the game APP, and the SoundPool processes an audio data source that needs to be played. After receiving the call request of the game APP, the SoundPool registers information about the audio data source that needs to be played, a process identifier of the corresponding APP, or other information, so as to execute a play procedure. In this case, the MediaServer creates an AudioTrack to play an audio stream transmitted by the SoundPool. In this embodiment of the present invention, when creating the AudioTrack, the MediaServer registers a block service by using the audio block service module provided by the MediaServer, and registers the PID of the application for the audio data source, a URI or an Fd of the audio data source, a stream type (stream type) (such as ALARM (alarm) or MUSIC (music)), and an identity (an identity of the SoundPool) of a processing module for processing the audio data source; and may further register other identification information that can be used for performing the audio block service on the audio data source. The identification information of the audio block service corresponding to the audio data source may be used for behavior analysis. In other words, a group of identification information of the audio block service can identify one audio play behavior of the audio processing device, for example, identify that which specific APP is playing which audio (identify that a song is played on NetEase Music).

In another example, a VoIP module directly calls the AudioTrack API to play audio, with no need of processing by the audio processing module. Specifically, during running of the VoIP module, a requirement for playing audio is generated. For example, during a Voice over Internet Protocol call, a voice needs to be played. An audio data source corresponding to the voice is VoIP data received over a network. The audio processing device temporally stores, in a local memory, the VoIP data received over the network, and the VoIP module decodes the VoIP data in the memory to obtain audio track data. While creating an AudioTrack to play the audio track data transmitted by the VoIP module, the MediaServer registers a block service by using the audio block service module provided by the MediaServer, and registers a PID of an application for the audio data source, a URI or an Fd of the audio data source, a stream type (stream type), an identity (an identity of the AudioTrack) of a processing module for processing the audio data source, and the like.

In another example, the MediaPlayer may directly play the audio data source, and a third-party APP may alternatively call the MediaPlayer API to play audio. Specifically, during running of the third-party APP, a requirement for playing the audio is generated, or a user triggers the MediaPlayer to play the audio. A MediaPlayerService creates a StagefrightPlayer, an AwesomePlayer, and an AudioTrack to play the audio data source. A parsing module (Extractor) parses the audio data source to obtain decoder information, and a decoder (OMXCodec) decodes the audio data source to obtain audio track data. While creating an AudioTrack, the MediaServer registers a block service by using the audio block service provided by the MediaServer, and registers a PID of an application for the audio data source, a uniform resource identifier (Uniform Resource Identifier, or URI) or a file descriptor (file descriptor, Fd) of the audio data source, a stream type (stream type) (such as ALARM (alarm) or MUSIC (music)), an identity (an identity of the SoundPool) of a processing module for processing the audio data source, and the like.

An audio block APP invokes the audio block service module by using the block service API, and blocks, by using the audio block service module, the audio data source that needs to be blocked. Specifically, the audio block APP provides, to the audio block service module, identification information used for performing the audio block service on the audio data source that needs to be blocked; and the audio block service module instructs, based on the identification information used for the registered audio block service, the AuidoTrack to provide, to the audio block APP by using the audio block service module, the audio track data corresponding to the audio data source that needs to be blocked.

The audio track module provides the audio track data to the mixing module for mixing, and then mixed data is provided to the hardware abstraction layer for play.

According to this embodiment of the present invention, the audio processing device may block an audio data source by using the audio block service module. During blocking, the audio data source that needs to be blocked is blocked based on identification information used for an audio block service. This can collect a user behavior sample in a targeted manner, analyze a user behavior based on the user behavior sample, and reduce difficulty in user behavior analysis.

Figure 5:
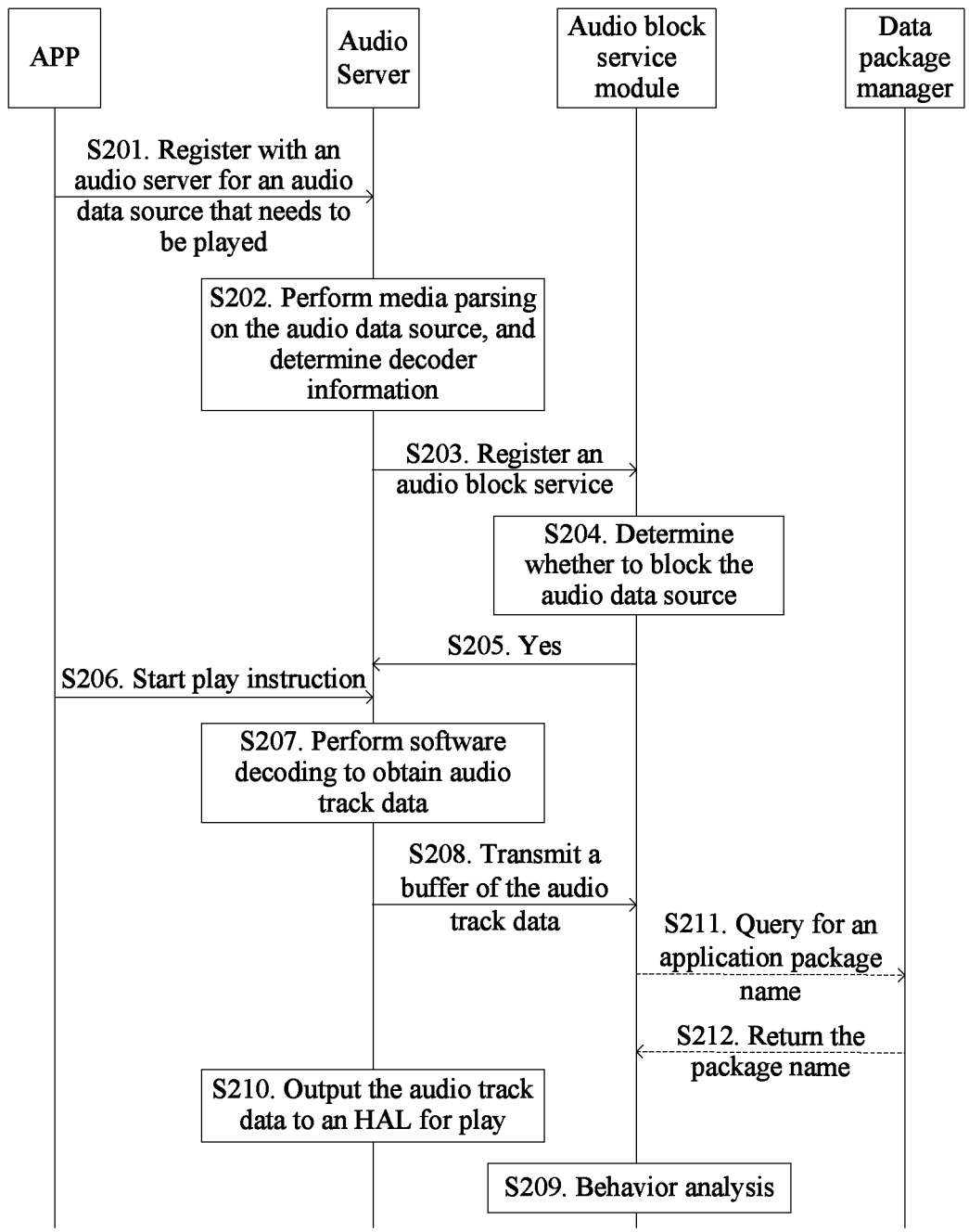
FIG. 5 is an information exchange diagram according to an embodiment of the present invention.

According to the foregoing module division, an embodiment of the present invention is further described by using an example of blocking an audio data source from an APP (a first application). FIG. 5 is an information exchange diagram according to this embodiment of the present invention. As shown in FIG. 5, this embodiment of the present invention may specifically include the following steps.

S201. An APP determines a requirement for playing an audio data source, and registers with a media service module. Specifically, the APP needs to register, with the media service module, a PID of the APP, a URI or an Fd of the audio data source that needs to be played, or other information.

During running, the APP usually has a requirement for playing audio. For example, a game APP needs to play audio, a music APP needs to play a song in a playlist, a video APP needs to play video-synchronous audio, and an instant messaging APP needs to play a message tone. The APP may call an API of an audio processing module provided by the media service module, to request the audio processing module in the media service module (such as a MediaPlayer or a SoundPool) to play the audio. After receiving the call request of the APP, the audio processing module registers with the media service module, and a process identifier (PID) of the APP and the URI or the Fd of the audio data source that needs to be played or other information are carried. In this way, the media service module may determine to play which audio data source.

S202. The media service module performs media parsing on the audio data source, and determines decoder information.

The media service module creates an audio track module (for example, AudioTrack), and establishes an IPC (interprocess communication, interprocess communication) channel between the audio track module and a mixing module (for example, AudioFlinger).

S203. The media service module registers an audio block service with an audio block service module (AudioIntercep-tor) (for example, the audio block service module 130 in FIG. 1).

During creation of the audio track module, the audio block service may be registered with the audio block service module. Identification information such as a PID, a stream type, and a ModuleID used for the audio block service are carried.

It can be understood that, the stream type may include VOICE_CALL (voice call), SYSTEM (system tone), RING (ring tone), MUSIC (music), ALARM (alarm), NOTIFICATION (notification tone), BLUETOOTH_SCO (Bluetooth audio), DTMF (dual-tone multifrequency, dual-tone multifrequency), TTS (text-to-speech, text-to-speech), and the like.

It should be noted that, the ModuleID can identify the audio track module and audio processing modules such as a ToneGenerator, the MediaPlayer, the SoundPool, an AudioPlayer, and a JetPlayer.

S204. The audio block service module determines, based on identification information used for the audio block service, whether to block the audio data source.

The audio block service module may perform filtering based on the identification information, for blocking. For example, only an audio data source corresponding to specified identification information is blocked. The specified identification information may be preset, or may be set by a behavior analysis module and then notified to the audio block service module.

S205. When determining to block the audio data source, the audio block service module sends, to the audio track module, an indication (first block indication information) for blocking the audio data source.

S206. The media service module receives a start play instruction sent by the APP.

The APP may execute audio actions such as starting, pausing, and ending play to the media service module based on a requirement of the APP. The media service module operates based on the foregoing instructions.

S207. The media service module performs, based on the decoder information and the indication for blocking the audio data source, software decoding on the audio data source that needs to be blocked, to obtain audio track data.

A decoding manner of the audio data source may include software decoding and hardware decoding. For the audio data source that needs to be blocked, if audio track data cannot be obtained by performing software decoding, the audio block service module may instruct the media service module to perform software decoding on the audio data source that needs to be blocked. In addition, for an audio data source that does not need to be blocked, the audio block service module may not intervene the decoding manner of the audio data source.

S208. The audio track module sends, to the audio block service module, a buffer (buffer) of the audio track data (a PCM stream) obtained by decoding the audio data source that needs to be blocked.

A process of sending the PCM buffer to the audio block service module is writing the PCM buffer into a shared memory based on a binder mechanism and then instructing the audio block service module to read the PCM buffer by using a shared memory pointer. The process may be implemented through inter-process communication or inter-linear communication.

S209. The audio block service module sends the buffer of the audio track data to a behavior analysis module, so that the behavior analysis module performs behavior analysis based on the buffer of the audio track data. For example, the audio track data is converted into text by using a speechto-text technology, and the text is used for semantic analysis, recognizing internally-recorded audio by a song recognition module, or the like.

S210. The media service module outputs the audio track data to a hardware abstraction layer (Hardware Abstraction Layer, HAL) for play.

It should be noted that, S205 and S206, and S209 and S210 are not necessarily performed in a particular order.

Optionally, the audio block service module may further obtain an APP package name based on the following steps, to provide the APP package name to the behavior analysis module for analysis.

S211. The audio block service module queries a package manager for an APP package name. For example, the audio block service module may provide a PID, and the package manager may query the APP package name based on the PID.

S212. The package manager returns the APP package name.

In addition, if the audio data source does not include an audio action, the audio block service module may determine, from the media service module, an audio action corresponding to the audio data source that needs to be blocked, and provide the audio action to the behavior analysis module for analysis.

Table 1 lists some examples about results obtained through analysis by the behavior analysis module.

TABLE 1

| Package name | Module ID | Stream type | Context |
|---|---|---|---|
| com.netease.cloudmusic | MediaPlayer | MUSIC | Listening music on NetEase Music |
| com.qiyi.video | AudioPlayer | MUSIC | Watching a video on iQIYI |
| com.autonavi.minimap | TTS | | In navigation by using AutoNavi |
| com.baidu.music | AudioTrack | MUSIC | Playing music on Baidu music |
| | AudioPlayer | | Playing a video on a video player |
| | | VOICE CALL | During an IP call |
| | | RING | An incoming call state |
| com.android.phone | | DTMF | Dialing |
| | ToneGenerator | | During IP dialing |
| com.halfbrick.fruitninjahd | JetPlayer | | Playing a game on Fruit Ninja |
| tencent.qqgame.lord | SoundPool | | Playing a Landlords game |
| com.htc.task | | ALARM | Agenda reminding |
| com.karakal.musicalarm | | ALARM | Reminding by using an alarm APP named QingCheng |

According to this embodiment of the present invention, the audio block service module can block an audio data source, and user behavior analysis is implemented based on other information corresponding to the audio data source, such as a package name of an APP playing the audio data source. In addition, the audio data source is blocked in a manner of obtaining audio data. This reduces difficulty in collection of a user behavior sample, and also reduces difficulty in user behavior analysis.

It should be noted that, the function module in the foregoing embodiment and a corresponding flowchart are merely an implementation of the present invention, and do not constitute a limitation. The function module in the foregoing embodiment may be implemented by combination of software and hardware.

Figure 6:
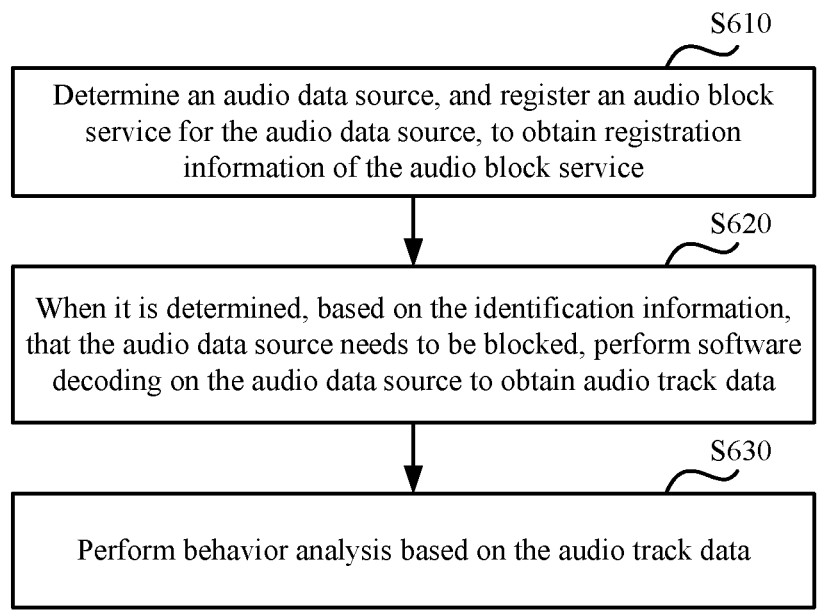
FIG. 6 is a flowchart of an audio processing method according to an embodiment of the present invention.

FIG. 6 is a flowchart of an audio processing method according to an embodiment of the present invention. Specifically, the following steps are included.

S610: Determine an audio data source, and register an audio block service for the audio data source, to obtain registration information of the audio block service, where the registration information of the audio block service includes identification information used for performing the audio block service on the audio data source.

It should be noted that, the audio data source may be an audio file or a video file stored in a local memory or an extended memory. Media that needs to be played may alternatively be a VoIP audio data package, or an audio data package received on a network side by an application. The corresponding audio data source may be determined based on a URI or an Fd. For a specific process, refer to the embodiment shown in FIG. 1. Details are not repeated.

After the audio data source is determined, it is required to register an audio block service for the audio data source. While registration is performed, a process identifier (Process identifier, PID) may be provided, and other information, such as a stream type, an API type, or a play mode, that can identify the audio data source may be further provided. The play mode may mean that which audio processing module is used to play the audio data source. For a specific process, refer to the embodiments shown in FIG. 2 and FIG. 3. Details are not repeated.

S620: When it is determined, based on the identification information, that the audio data source needs to be blocked, perform software decoding on the audio data source to obtain audio track data.

After the audio block service is registered for the audio data source, whether the audio data source needs to be blocked may be determined based on the identification information in the registration information.

For play modes of different audio processing modules, decoding procedures are different. For some audio data sources that do not need to be blocked, a software decoding procedure or a hardware decoding procedure may be executed. For an audio data source that needs to be blocked, the software decoding procedure needs to be executed. A PCM stream, that is, audio track data, may be obtained by decoding the audio data source.

In addition, an identification information set of the audio data source that needs to be blocked may be further determined; whether the identification information in the current registration information of the audio block service is in the identification information set is determined; and when the current registration information of the audio block service is in the identification information set, it is determined that the audio data source needs to be blocked. For this process, refer to related description about the identification information table in the embodiment shown in FIG. 2. Details are not repeated.

S630: Perform behavior analysis based on the audio track data.

The audio track data is converted into text by performing speech recognition on the audio track data, and the text can be used for semantic analysis, recognizing internally-recorded audio by a song recognition module, or the like. Further, situation awareness may be performed based on the audio track data.

Further, comprehensive analysis may be performed based on the registration information and/or data package information of the audio data source.

According to this embodiment of the present invention, an audio data source can be blocked by blocking audio track data, so as to reduce difficulty in collection of a user behavior sample. In addition, the audio data source is blocked in a targeted manner based on an identity for an audio block service. This causes relatively low resource consumption and improves user experience.

Figure 7:
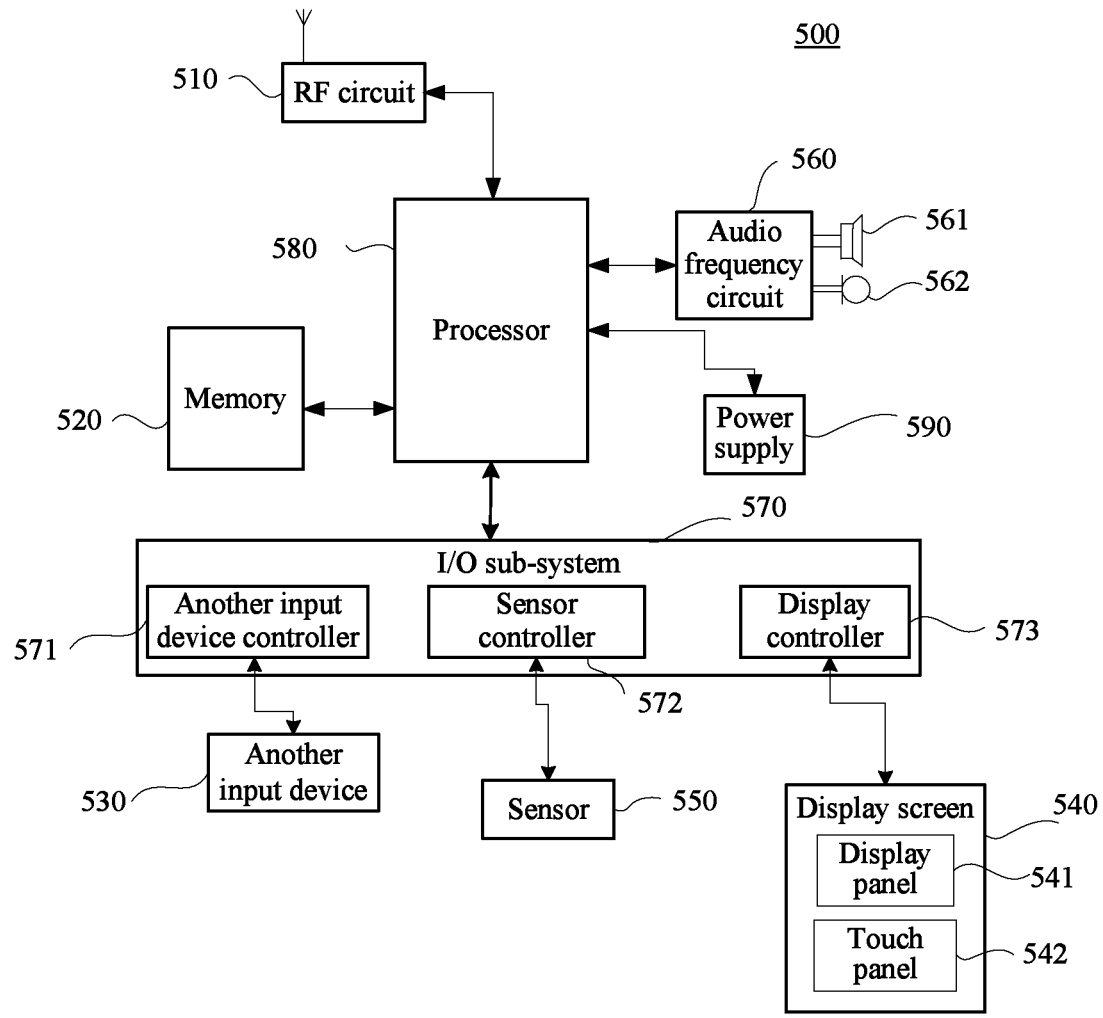
FIG. 7 is a schematic structural diagram of a terminal device according to an embodiment of the present invention.

FIG. 7 is a schematic structural diagram of a terminal device according to an embodiment of the present invention. For example, the terminal device is a mobile phone. FIG. 7 shows a block diagram of a partial structure of the mobile phone 500 related to this embodiment of the present invention. Referring to FIG. 7, the mobile phone 500 includes components such as an RF (Radio Frequency, radio frequency) circuit 510, a memory 520, another input device 530, a display screen 540, a sensor 550, an audio frequency circuit 560, an I/O subsystem 570, a processor 580, and a power supply 590. A person skilled in the art may understand that, a mobile phone structure shown in FIG. 5 does not constitute a limitation on the mobile phone. The mobile phone may include components more or fewer than those shown in the figure, or a combination or separation of some components, or components disposed differently. A person skilled in the art may understand that the display screen 540 belongs to a user interface (UI, User Interface), and the mobile phone 500 may include user interfaces more or fewer than those shown in the figure.

The following details each component of the mobile phone 500 with reference to FIG. 5.

The RF circuit 510 may be configured to receive and send information, or receive and send a signal in a call process (for example, a VoIP call). Particularly, the RF circuit 510 receives downlink information (an audio data source) of a base station and then sends the downlink information to the processor 580 for processing, and also sends related uplink data (for example, a request for obtaining the audio data source) to the base station. Usually, the RF circuit includes but is not limited to an antenna, at least one amplifier, a transceiver, a coupler, an LNA (Low Noise Amplifier, low noise amplifier), and a duplexer. In addition, the RF circuit 510 may bidirectionally communicate with a network and another device in a manner of wireless communication. Any communications standard or protocol may be used for the wireless communication, including but not limited to GSM (Global System of Mobile Communication, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), an email protocol, and an SMS (Short Message Service, short message service) protocol.

The memory 520 may be configured to store a software program (such as a music player, a VoIP module, and an operating system) and data. The processor 580 runs the software program stored in the memory 520, so as to execute various functions of the mobile phone 500 and perform data processing. The memory 520 may mainly include a program storage area and a data storage area. The program storage area may store an operating system, an application required for at least one function (such as an audio play function and a video play function), and the like. The data storage area may store data (such as audio data, and duration and time of a VoIP call) created based on use of the mobile phone 500, and the like. In addition, the memory 520 may include a high-speed random access memory, and may further include a non-volatile memory such as at least one disk storage device, a flash memory device, or another volatile solid-state storage device.

The another input device 530 may be configured to receive input digital or character information, and generate a key signal input (such as starting, pausing, ending, switching, fast forwarding, and fast rewinding) related to user setting and function control of the mobile phone 500. Specifically, the another input device 530 may include but is not limited to one or more of a physical keyboard, a function key (such as a volume control key or an on/off key), a trackball, a mouse, a joystick, an optical mouse (the optical mouse is a touch-sensitive surface that does not display a visual output, and an extension of a touch-sensitive surface formed by a touchscreen). The another input device 530 is connected to another input device controller 571 of the I/O subsystem 570, and performs signal exchange with the processor 580 under control of the another input device controller 571. It should be known that, in this embodiment of the present invention, the another input device 530 may be responsible for interaction with a user, and may obtain a user behavior sample based on information generated by the another input device 530. In combination with a program running on the mobile phone 500, The display screen 540 may be configured to display information entered by the user or information provided to the user and various menus (such as a playlist and play progress) of the mobile phone 500. In addition, the display screen 540 may receive a user input. Specifically, the display screen 540 may include a display panel 541 and a touch panel 542. The display panel 541 may be configured in a form of an LCD (Liquid Crystal Display, liquid crystal display), an OLED (Organic Light-Emitting Diode, organic light-emitting diode), or the like. The touch panel 542, or referred to as a touchscreen, a touch-sensitive screen, or the like, may collect a touch or non-touch operation performed by a user on or near the touch panel 542 (for example, an operation performed by the user on or near the touch panel 542 by using any proper object or accessory such as a finger or a stylus); and a somatosensory operation may also be included. The operation includes a single-point control operation, a multi-point control operation, and other types of operations. Optionally, the touch panel 542 may include two parts: a touch detection apparatus and a touch controller. The touch detection apparatus detects a touch orientation and a gesture of the user, detects a signal generated by a touch operation, and transmits the signal to the touch controller. The touch controller receives touch information from the touch detection apparatus, converts the touch information into information that can be processed by the processor, and sends the information to the processor 580; and can receive a command sent by the processor 580 and execute the command. In addition, the touch panel 542 may be implemented by using a plurality of types, such as a resistive type, a capacitive type, an infrared type, and a surface acoustic wave type. In addition, the touch panel 542 may be implemented by using any technology that is to be developed in future. Further, the touch panel 542 may cover the display panel 541. The user may perform, based on content displayed on the display panel 541 (the displayed content includes but is not limited to a soft keyboard, a virtual mouse, a virtual key, and an icon), an operation on or near the touch panel 542 that covers the display panel 541. After detecting the operation performed on or near the touch panel 542, the touch panel 542 transmits information about the operation to the processor 580 by using the I/O subsystem 570, to determine a user input, and then the processor 480 provides a corresponding visual output on the display panel 541 based on the user input by using the I/O subsystem 570. In FIG. 5, the touch panel 542 and the display panel 541 are used as two independent components to implement input and input functions of the mobile phone 500. However, in some embodiments, the touch panel 542 and the display panel 541 may be integrated to implement the input and output functions of the mobile phone 500. It should be noted that, in this embodiment of the present invention, The mobile phone 500 may further include at least one type of sensor 550, such as a light sensor, a motion sensor, and another sensor. Specifically, the light sensor may include an ambient light sensor and a proximity sensor. The ambient light sensor may adjust luminance of the display panel 541 based on brightness of ambient light. The proximity sensor may turn off the display panel 541 and/or backlight when the mobile phone 500 moves close to an ear. As a type of motion sensor, an accelerometer sensor may detect magnitudes of acceleration in all directions (usually, three axes), may detect, in a still state, a magnitude and a direction of gravity, and may be used for an application that recognizes a posture (such as screen switching between a landscape mode and a portrait mode, a related game, and magnetometer posture calibration) of the mobile phone, a vibration-identification-related function (such as a pedometer and tapping), and the like. Other sensors that can be configured in the mobile phone 500, such as a gyroscope, a barometer, a hygrometer, a thermometer, and an infrared sensor, are not described herein. User behavior data may be determined by using the sensor 550 for analysis.

The audio frequency circuit 560, a loudspeaker 561, and a microphone 562 may provide an audio interface between a user and the mobile phone 500. The audio frequency circuit 560 may transmit, to the loudspeaker 561, an analog signal that is obtained by digital-to-analog conversion of received audio track data, and the loudspeaker 561 converts the analog signal into a sound signal for output. In addition, the microphone 562 converts a collected sound signal into an analog signal, the audio frequency circuit 560 receives the analog signal and converts the analog signal into audio data through analog-digital conversion, and outputs the audio data to the RF circuit 510, to send the audio data to, for example, another mobile phone; or outputs the audio data to the memory 520 for further processing (for example, play).

The I/O subsystem 570 is configured to control an external input/output device, and may include the another input device controller 571, a sensor controller 572, and a display controller 573. Optionally, one or more other input device controllers 571 receive a signal from the another input device 530 and/or send a signal to the another input device 530. The another input device 530 may include a physical button (a press button, a rocker button, or the like), a dial pad, a slide switch, a joystick, a click scroll wheel, or an optical mouse (the optical mouse is a touch-sensitive surface that does not display a visual output, or an extension of a touch-sensitive surface formed by a touchscreen). It should be noted that the another input control device controller 571 may be connected to any one or more of the foregoing devices. The display controller 573 in the I/O subsystem 570 receives/sends a signal from/to the display screen 540. After the display screen 540 detects a user input, the display controller 573 converts the detected user input into interaction with a user interface object displayed on the display screen 540, that is, implements man-machine interaction. The sensor controller 572 may receive/send a signal from/to one or more sensors 550.

The processor 580 is a control center of the mobile phone 500, is connected to all the parts of the entire mobile phone by using various interfaces and lines, and executes, by running or executing the software program and/or a module that are/is stored in the memory 520. For example, the modules shown in FIG. 1 or FIG. 3 can be run in the processor 580. In addition, the processor 580 invokes data stored in the memory 520 to perform the following steps: determining an audio data source, and registering an audio block service for the audio data source, to obtain registration information of the audio block service, where the registration information of the audio block service includes identification information used for performing the audio block service on the audio data source; when it is determined, based on the identification information, that the audio data source needs to be blocked, performing software decoding on the audio data source to obtain audio track data; and performing behavior analysis based on the audio track data. Optionally, the processor 580 may include one or more processing units. Preferably, an application processor and a modem processor may be integrated into the processor 580. The application processor mainly processes an operating system, a user interface, an application, and the like. The modem processor mainly processes wireless communication (mobile communication). It can be understood that, the modem processor may alternatively not be integrated into the processor 580.

The mobile phone 500 further includes the power supply 590 (such as a battery) that supplies power to each component. Preferably, the power supply may be logically connected to the processor 580 by using a power management system, so as to implement functions such as charging management, discharging management, and power consumption management by using the power management system.

Although not shown, the mobile phone 500 may further include a camera, a Bluetooth module, or the like, and details are not described herein.

A person of ordinary skill in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are executed by hardware or software depends on particular applications and design constraint conditions of the technical solutions. A person of ordinary skill in the art may use different methods to implement the described functions for each specified application, but it should not be considered that the implementation goes beyond the scope of the present invention.

A person of ordinary skill in the art may understand that all or a part of the steps in each of the foregoing method of the embodiments may be implemented by a program instructing a processor. The program may be stored in a computer-readable storage medium. The storage medium may be a non-transitory (English: non-transitory) medium, such as a random-access memory, a read-only memory, a flash memory, a hard disk, a solid-state drive, a magnetic tape (English: magnetic tape), a floppy disk (English: floppy disk), an optical disc (English: optical disc), or any combination thereof.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An audio processing method, comprising:
receiving, by an application of a terminal device, a first register request, wherein the first register request comprises a process identifier (PID) of the application, a Uniform Resource Identifier (URI), or a file descriptor (FD) of an audio data source, and wherein the application is installed on the terminal device;
determining, by the terminal device, the audio data source according to the first register request;
parsing, by the terminal device, the audio data source;
obtaining, by the terminal device, decoder information;
registering, by the terminal device, an audio block service for the audio data source;
obtaining, by the terminal device, registration information of the audio block service, wherein the registration information of the audio block service comprises identification information used for performing the audio block service on the audio data source, and wherein the identification information comprises at least one of a stream type, the PID of the application, or a play mode;
receiving, by the terminal device, a request to start play;
performing, by the terminal device, software decoding on the audio data source to obtain audio track data; and
performing, by the terminal device, behavior analysis based on the audio track data to obtain a name of the application, wherein the behavior analysis comprises using situation awareness and the audio track data to obtain the name of the application.

2. The audio processing method of claim 1, wherein the audio data source comprises an audio file, a video file, or a Voice over Internet Protocol (VoIP) data stream.

3. The audio processing method of claim 1, further comprising generating a correspondence table based on the behavior analysis, wherein the correspondence table comprises entries that each associates a package name with a module identifier, the stream type, and a context.

4. The audio processing method of claim 3, wherein the context comprises listening to music, watching a video, receiving an incoming call, playing a game, or performing a reminder.

5. The audio processing method of claim 3, wherein the stream type comprises a music type, a voice call type, a ring type, or an alarm type.

6. A terminal device, comprising:
at least one processor; and
at least one memory coupled to the at least one processor, wherein the at least one memory comprises instructions, that when executed by the at least one processor, cause the terminal device to:
register an audio block service for an audio data source;
obtain registration information of the audio block service, wherein the registration information of the audio block service comprises identification information used for performing the audio block service on the audio data source, and wherein the identification information comprises at least one of a stream type, a processor identifier (PID) of an application, or a play mode;
receive a request to start play;
perform software decoding on the audio data source to obtain audio track data; and
perform behavior analysis based on the audio track data to obtain a name of the application, wherein the behavior analysis comprises using situation awareness and the audio track data to obtain the name of the application.

7. The terminal device of claim 6, wherein the audio data source comprises an audio file, a video file, or a Voice over Internet Protocol (VoIP) data stream.

8. The terminal device of claim 6, wherein the instructions further cause the terminal device to generate a correspondence table based on the behavior analysis, and wherein the correspondence table comprises entries that each associates a package name with a module identifier, the stream type, and a context.

9. The terminal device of claim 8, wherein the context comprises listening to music, watching a video, receiving an incoming call, playing a game, or performing a reminder.

10. The terminal device of claim 8, wherein the stream type comprises a music type, a voice call type, a ring type, or an alarm type.

11. An electronic device, comprising:
a display;
at least one processor coupled to the display; and
at least one memory coupled to the at least one processer, wherein the at least one memory comprises instructions that when executed by the at least one processor, cause the electronic device to:
determine an audio data source;
register an audio block service for the audio data source to obtain registration information of the audio block service, wherein the registration information of the audio block service comprises identification information used for performing the audio block service on the audio data source, and wherein the identification information comprises at least one of a stream type, a process identifier of an application, or a play mode;
perform software decoding on the audio data source to obtain audio track data when the audio data source needs to be blocked, wherein the audio data source that needs to be blocked is identified based on the identification information;
perform behavior analysis based on the audio track data to obtain a name of the application, wherein the behavior analysis comprises using situation awareness and the audio track data to obtain the name of the application;
obtain first information that indicates a status of a person who is wearing the electronic device; and
associate the name of the application, content of the application, and the status.

12. The electronic device of claim 11, wherein the status is running.

13. The electronic device of claim 11, wherein the status is jogging.

14. The electronic device of claim 11, wherein the application is a music player.

15. The electronic device of claim 11, wherein the first information is from a fitness application.

16. The electronic device of claim 11, further comprising a motion sensor coupled to the at least one processor, wherein the first information is from the motion sensor.

17. The electronic device of claim 11, wherein the audio data source comprises an audio file, a video file, or a Voice over Internet Protocol (VoIP) data stream.

18. The electronic device of claim 11, wherein the instructions further cause the electronic device to generate a correspondence table based on the behavior analysis, and wherein the correspondence table comprises entries that each associates a package name with a module identifier, the stream type, and a context.

19. The electronic device of claim 18, wherein the context comprises listening to music, watching a video, receiving an incoming call, playing a game, or performing a reminder.

20. The electronic device of claim 18, wherein the stream type comprises a music type, a voice call type, a ring type, or an alarm type.

\* \* \* \* \*